Dec. 11, 1956 W. M. VAN OTTEREN ET AL 2,773,658
TRANSFER DEVICE FOR CONVEYOR SYSTEM
Filed Aug. 26, 1954 6 Sheets-Sheet 1

INVENTORS
WILBUR M. VanOTTEREN
& WILLIAM J. HAFNER
BY Barnes, Kisselle, Laughlin & Raisch
ATTORNEYS.

Dec. 11, 1956 W. M. VAN OTTEREN ET AL 2,773,658
TRANSFER DEVICE FOR CONVEYOR SYSTEM
Filed Aug. 26, 1954 6 Sheets-Sheet 2

INVENTORS
WILBUR M. VAN OTTEREN
& WILLIAM J. HAFNER
BY
Barnes, Kisselle, Laughlin & Raisch
ATTORNEYS.

INVENTORS
WILBUR M. VAN OTTEREN
& WILLIAM J. HAFNER
ATTORNEYS.

INVENTORS
WILBUR M. VanOTTEREN
& WILLIAM J. HAFNER
BY Barnes, Kisselle, Laughlin & Raisch
ATTORNEYS.

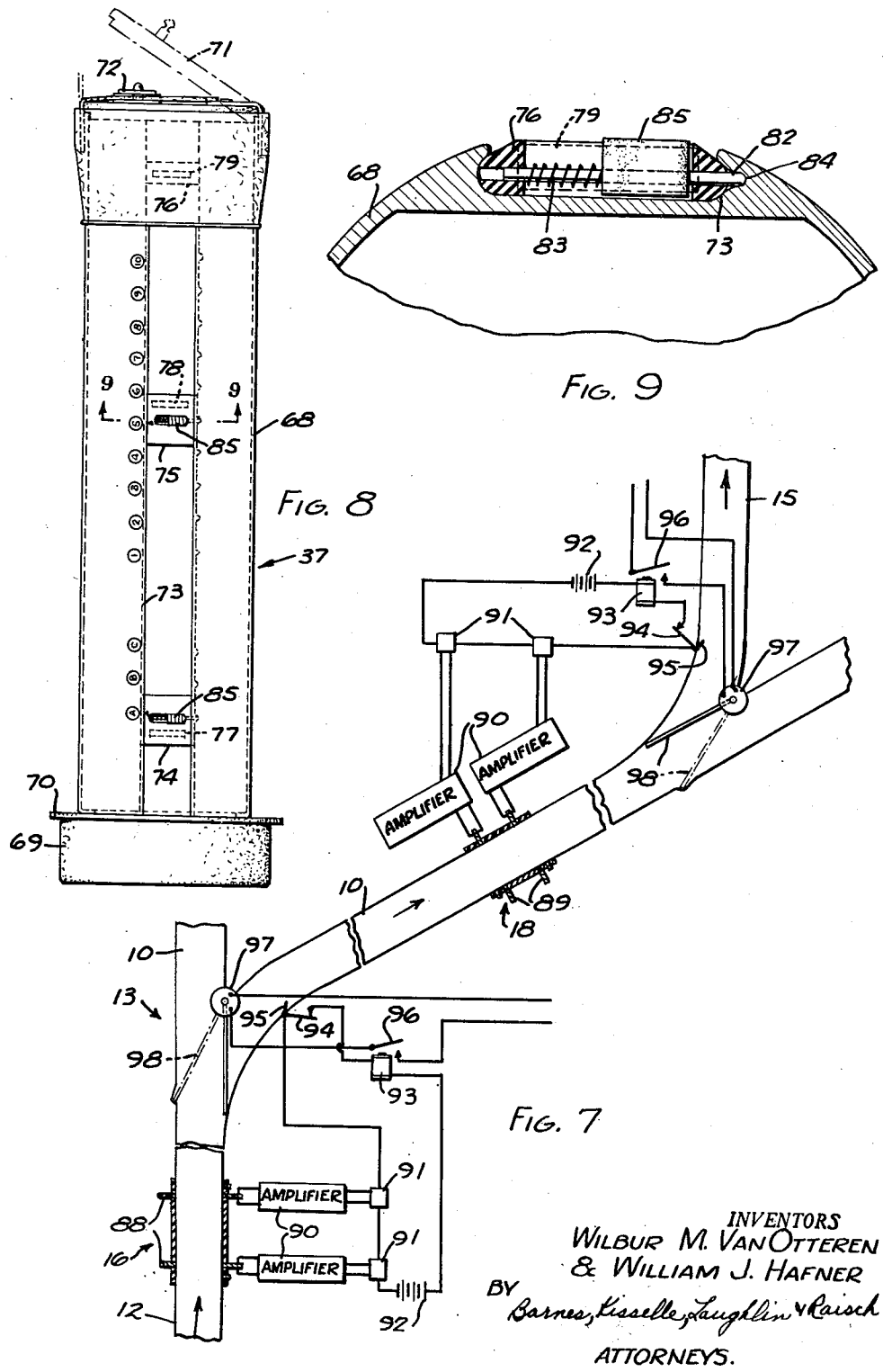

United States Patent Office 2,773,658
Patented Dec. 11, 1956

2,773,658

TRANSFER DEVICE FOR CONVEYOR SYSTEM

Wilbur M. Van Otteren and William J. Hafner, Detroit, Mich., assignors to The Grover Company, Detroit, Mich., a corporation of Michigan Application August 26, 1954, Serial No. 452,242

27 Claims. (Cl. 243—1)

This invention relates to a device for transferring individually propelled carriers in a conveyor system from one conduit to another.

An exemplary application of the invention lies in a pneumatic conveyor system having a number of conduits, each with a number of terminals, the conduits connecting into a common transfer device which receives carriers and dispatches them to their destinations. It is desirable that the transfer device dispatch waiting carriers alternately from the various inlet conduits to equalize the flow therethrough. The speed of a carrier in a conduit varies according to such factors as its physical condition and its load so that it is desirable for the transfer device to dispatch carriers at predetermined time intervals to prevent their overtaking each other in transit. It is desirable for the transfer device to dispatch a carrier each time it goes through a timed cycle in order to transfer the carriers at a maximum rate.

An object of this invention is to provide a simple, inexpensive, automatic transfer device having the above characteristics. One form of the invention is shown in the accompanying drawings.

Fig. 7 is a diagrammatic view of the receptor means for operating gates at conduit intersections.

Fig. 8 is a top plan view of a carrier for use in the system.

Fig. 9 is an enlarged sectional view on line 9—9 of Fig. 8.

Figure 1:
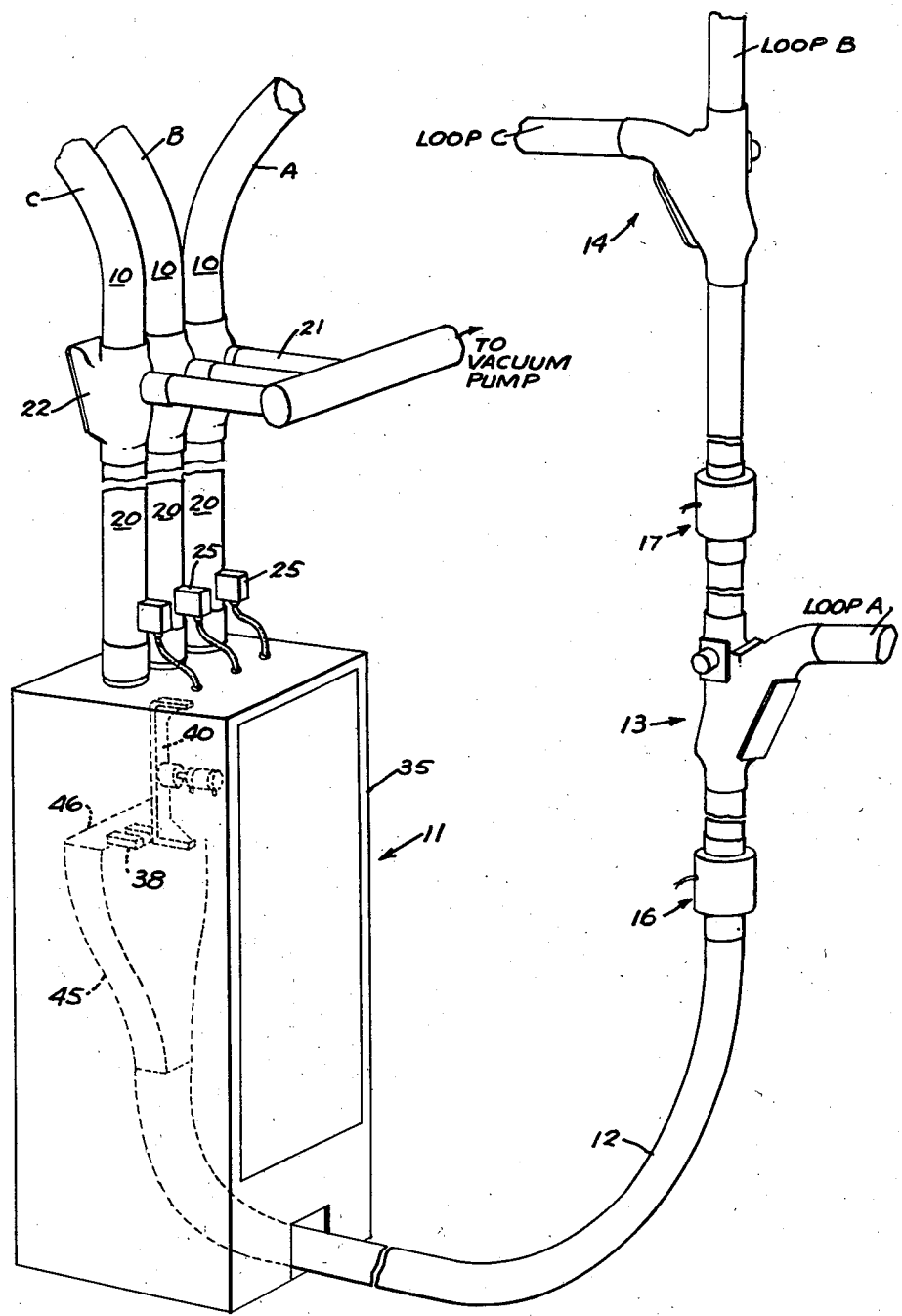
Fig. 1 is a partly diagrammatic perspective view of a transfer device according to this invention connected into a conduit system.
Figure 2:
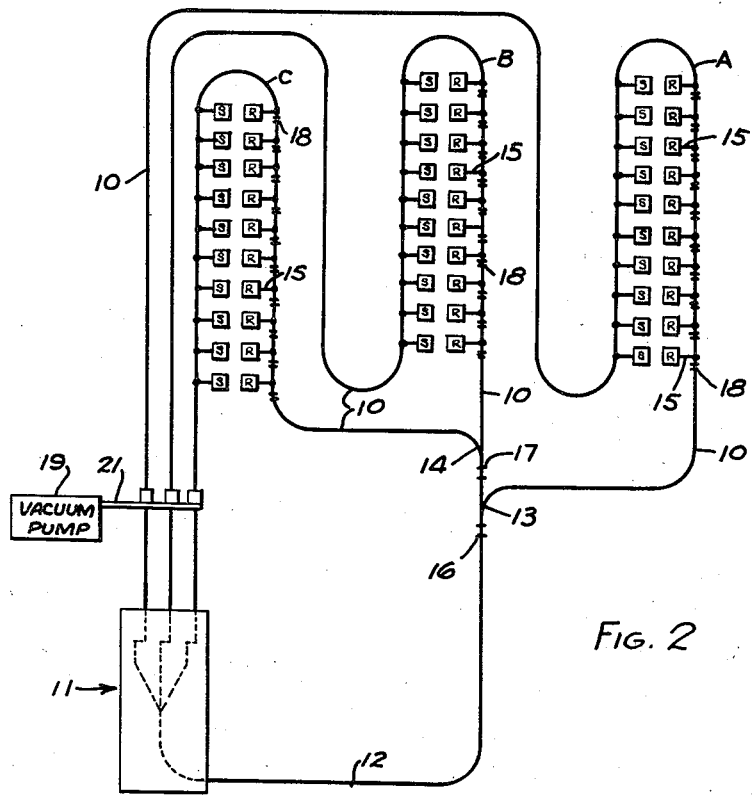
Fig. 2 is a schematic diagram of a conveyor system including the transfer device.

Fig. 2 shows a conveyor system having pneumatic trunk conduits or tubes 10 arranged in circuits or loops A, B and C, each having a number of terminals with a sending station S and a receiving station R. Each loop connects into the upstream end of a transfer device 11 and a common conduit 12 extends from the downstream end of the transfer to conduit intersections 13 and 14 connected to the loops. Branch conduits 15 connect trunk conduits 10 to each receiving station R. Gates at intersections 13 and 14 are operated by receptors 16 and 17 and gates at the branch conduits are operated by receptors 18. A vacuum pump 19 is connected to conduits 10 by vacuum lines 21 upstream from transfer 11. Flap valves 22 (Fig. 1) seal transfer inlet tubes 20 from conduits 10 to preserve the vacuum therein.

An actuating switch (Figs. 1 and 6) 25 mounted on each inlet 20 has operating means including an element 26 projecting into the inlet and attached to a pivotally mounted cam 27 having a flat 28 engaging a lever 29 on the switch. Element 26 is engaged by a carrier entering inlet 20 to rotate cam 27 and close microswitch 25. A spring 30 returns element 26 to open the switch when there are no carriers in the inlet.

Transfer 11 has a body 35 supporting a shelf 36 spaced below the open end of each inlet tube 20 a distance slightly greater than the length of a carrier 37 (Fig. 8). Shelves 36 are preferably perpendicular to the axes of inlets 20 and have bumpers 38 of felt or rubber or the like onto which carriers drop from the inlets. Each shelf 36 supports a lower track 39 for a reciprocable dispatching member 40. An upper track for each dispatcher is mounted in the body as shown at 41. Bumpers 38 may be spaced apart so that tracks 39 may extend to the forward edge 42 of each shelf 36.

A funnel 45 is mounted within transfer body 35 with its larger upper end 46 adjacent the forward edges 42 of shelves 36. Flexible baffles 47 depending into the funnel from supports 43 divide the funnel into channels 48, 49 and 50 which decur into common conduit 12. The baffles are preferably made of leather and have free lower ends 51 which are swung aside by carriers dropping through outer channels 48 and 50 into common conduit 12.

Figure 3:
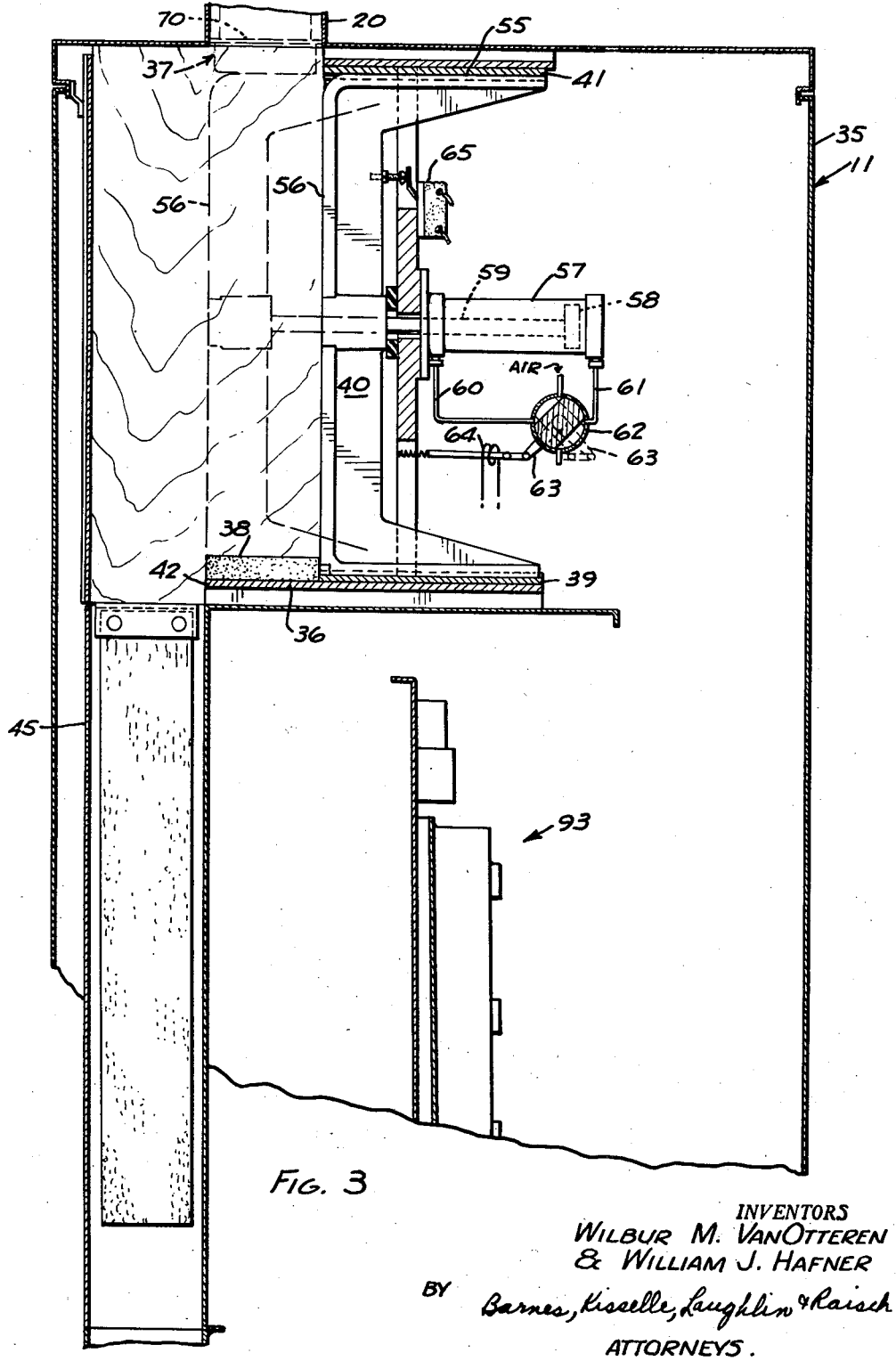
Fig. 3 is an enlarged sectional view of the transfer device with some parts shown schematically.

Each dispatcher 40 has a top portion 55 positioned beneath the end of an inlet tube 20 for receiving and supporting a carrier when the dispatcher is in the advanced position illustrated in dotted lines in Fig. 3. The front portion 56 of each dispatcher is positioned for pushing a carrier off of shelf 36 into funnel 45 when the dispatcher advances from its retracted position shown in solid lines in Fig. 3. Each dispatcher is shifted by powered means, preferably comprising, a pneumatic cylinder 57 with a piston 58 therein connected to the dispatcher by a piston rod 59. Pneumatic pressure lines 60 and 61 are connected to a source of air pressure through an operating valve 62 having an operating member 63 operable by a spring-returned solenoid 64. The dispatcher closes a limit switch 65 at the end of its retracting stroke for a purpose to be described.

Carrier 37 has a body 68 with a resilient bumper 69 and an air disk 70 at one end and a hinged cover 71 securable in closed position by a fastener 72 at its other end. Carrier body 68 has an axially extending track 73 with slides 74 and 75 and a fixed element 76 thereon. The slides and fixed element contain permanent magnets 77, 78 and 79 for influencing receptors 16, 17 and 18. The slides are preferably identically constructed and are secured in selected positions relatively to holder 76 by pins 82 biased by springs 83 for engagement within locking recesses 84 in the track. Pins 84 are unlocked for shifting the slides by manipulating button 85 to the left as Fig. 9 is viewed.

The poles of the magnets extend radially of carrier body 68 with one pole positioned adjacent the radial outer extremity of the carrier to pass closely to the receptors. Fixed magnet 79 and one movable magnet such as magnet 78 have like poles extending outwardly while the poles of the other movable magnet 77 are reversed.

Each receptor has a pair of coils spaced apart a predetermined distance on the outside of a conduit upstream of a conduit intersection. Receptors 16 and 17 have coils 88 wound in opposite directions and receptors 18 have coils 89 wound in the same direction. The axial interval between the coils in receptors 16 and 17 is different and the interval between coils 89 in receptors 18 varies for each branch 15. Receptor coils 88 and 89 are connected to amplifiers 90 which amplify the current generated when the coils cut the magnetic fields of magnets on a passing carrier. The amplified impulses are fed into electronic switches 91 which may comprise thyratrons arranged in series with a source of direct current 92, a relay coil 93 and a circuit breaking switch 94 having an operating element 95 projecting into the adjacent conduit. Coil 93 operates a switch 96 in a circuit containing a solenoid 97 and a power source not shown. Solenoid 97 operates a gate 98 at each conduit intersection. Thyratrons 91 are arranged to close and energize coil 93 only upon receiving simultaneous positive impulses from the receptor coils.

A carrier 37 is addressed to a selected loop such as loop A by positioning slide 74 at A (Fig. 8) to space magnet 77 from fixed magnet 79 a distance equal to the interval between receptor coils 88 at intersection 13. The carrier is addressed to a selected terminal in loop A by adjusting slide 75, for example, to position 5, for spacing magnet 78 from magnet 79 a distance equal to the interval between the receptor coils 89 at the branch 15 leading to the selected terminal. The carrier is then inserted into conduit 10 through sending station S and is propelled toward transfer device 11.

The carrier's momentum carries it through flap valve 19 into inlet tube 20. Dispatcher 40 is in forward position and the carrier comes to rest on its top 55 as shown in dotted lines in Fig. 3. Upon entering inlet tube 20 the carrier engages operating element 26 to rotate cam 27 and close switch 25 for actuating a master electrical timer. After a predetermined interval the timer closes an electrical circuit energizing solenoid 64 which, through operating element 63, shifts valve 62 to the solid line position of Fig. 3. Air pressure entering cylinder 57 through pressure line 60 causes piston 58 and the dispatcher to retract to the solid line position. Top portion 55 of the dispatcher is withdrawn from the end of inlet tube 20 and the carrier drops onto bumpers 38, element 26 returning to normal position and opening switch 25. If two carriers are in one inlet, the first, having dropped to shelf 36, supports the second until top 55 moves under it in advancing to its forward position.

Figure 4:
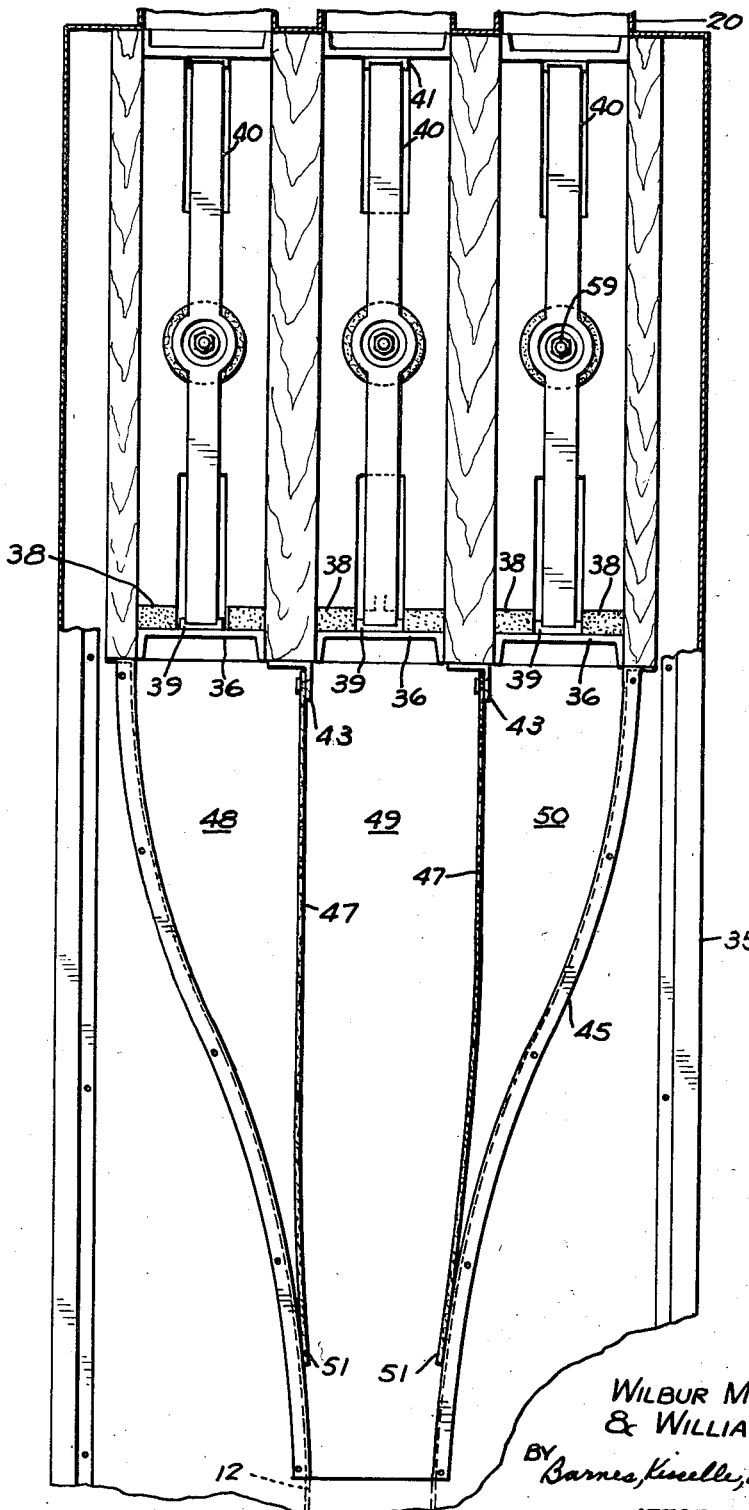
Fig. 4 is an enlarged front elevational view of the transfer device with some parts shown in section.

A carrier is liable to bounce somewhat before coming to rest on bumpers 38. When the dispatcher reaches its retracted position it operates limit switch 65 and actuates another timer which, after an interval sufficient for the carrier to come to rest, breaks the circuit energizing solenoid 64 which returns valve 62 to the dotted line position. Air pressure enters cylinder 57 through line 61 and exhausts through line 60 so that piston 58 and the dispatcher are pushed forwardly. The front portion 56 of the dispatcher pushes the carrier off of shelf 36 so that the carrier drops into funnel 45 and passes into common conduit 12. Baffles 47 keep the carriers in generally vertical position as Fig. 4 is viewed to prevent their jamming in the funnel. The cycle is repeated whenever a carrier enters an inlet 20 from either loop A, B or C.

A carrier entering common conduit 12 from funnel 45 is propelled toward intersection 13. When the unlike fields of magnets 77 and 79 are simultaneously cut by the oppositely wound receptor coils 88, simultaneous positive impulses are generated which operate in the manner described to actuate coil 93 and close switch 96. Solenoid 97 is energized and shifts gate 98 to open position for diverting the carrier into trunk conduit 10 for loop A. When the carrier passes intersection 13, it strikes element 95 which opens switch 94 momentarily, thereby de-energizing coil 93 and solenoid 97 so that gate 98 returns to closed position. The carrier proceeds through trunk conduit 10 until the like fields of magnets 78 and 79 are simultaneously cut by the like wound receptor coils 89 and open gate 98 and divert the carrier into selected branch conduit 15. The carrier strikes element 95 to close the gate in the manner described.

The carriers travel at different speeds through the tubes depending on their physical condition and the loads which they carry and must be spaced apart a sufficient distance to prevent their overtaking one another and interfering with operation of gates 98 at the conduit intersections. The interval necessary between carriers depends in part on the distance between transfer 11 and the terminal furthest therefrom. Accordingly, the transfer is arranged to dispatch carriers into common conduit 12 at predetermined intervals which can be varied by regulating the master timer.

When there are carriers in all three inlets 20, all three actuating switches 25 are closed and dispatchers 40 are reciprocated alternately at the proper intervals. When one inlet tube is emptied, its dispatcher comes to rest in its forward position while the other two dispatchers continue to reciprocate alternately. When a second tube empties, its dispatcher also comes to rest and the third dispatcher continues to reciprocate at the proper intervals for so long as there are carriers in its inlet. If, in the meantime, carriers have entered one or both of the other inlets, then their respective dispatchers resume alternate reciprocation.

It is important to note that the flow of carriers from each of the loops A, B and C is equalized and that since the dispatchers for empty inlet tubes remain inactive, carriers are dispatched into common conduit 12 at a maximum rate. For example, assuming that the master timer is set at five seconds and the individual timers actuated by limit switches 65 are set at one second, a carrier will be dropped into funnel 45 approximately every six seconds for so long as there are any carriers in inlets 20 and regardless of which inlets they are in.

Figure 5:
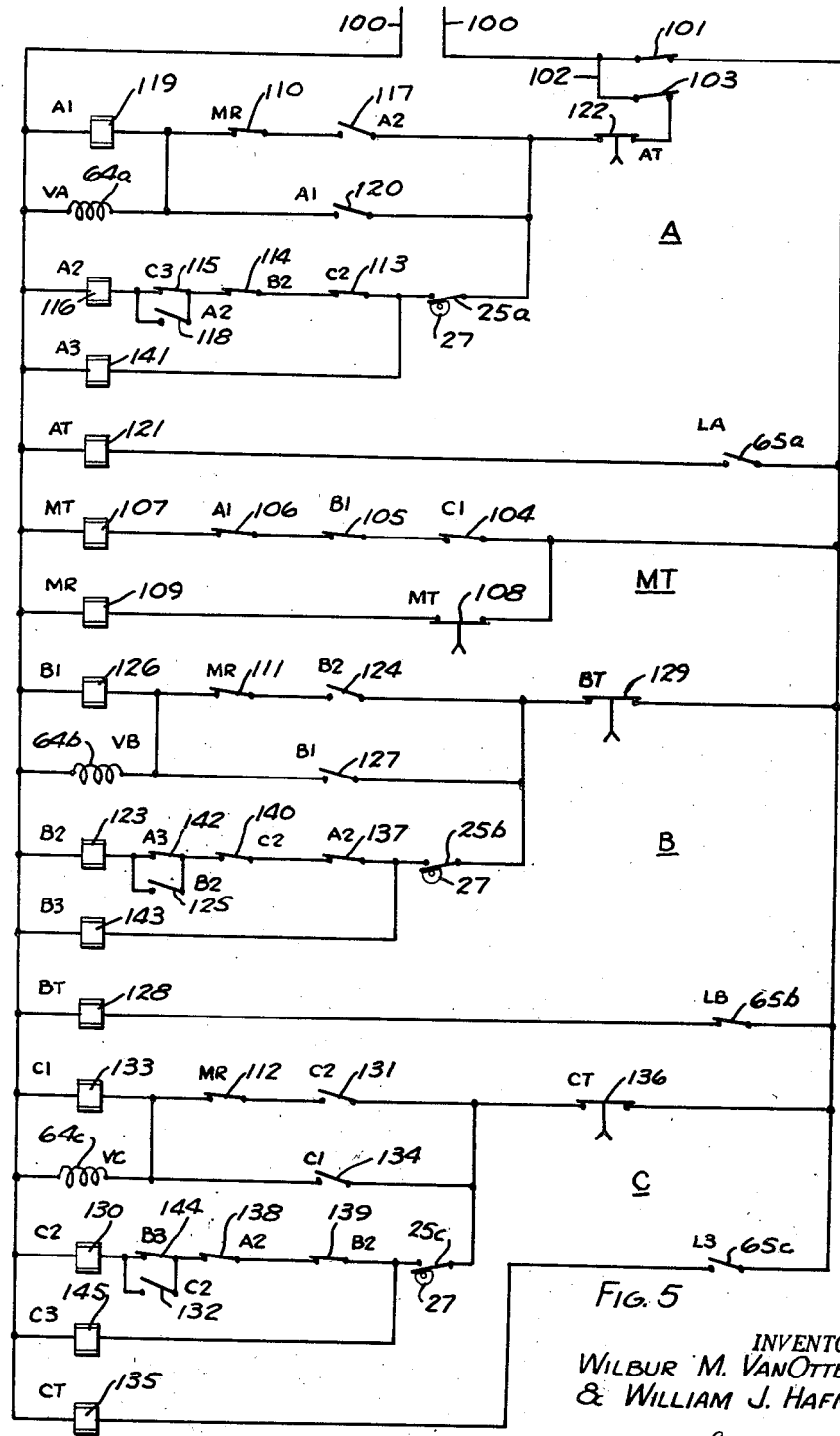
Fig. 5 is a simple schematic representation of an electrical circuit for operating the transfer device.

Fig. 5 shows an electrical circuit having sub-circuits A, B and C for operating respectively the dispatchers 40 for conduit loops A, B and C and having a master timer circuit MT. Each circuit contains a number of relays and switches. For simplicity the relays are represented in the drawing as separated from the switches operated thereby, though in fact they are adjacent. Each relay and the switches operated thereby are identified by like lettered reference characters, for example, solenoid A2 in circuit A operates switches A2 in circuits A, B and C.

Figure 6:
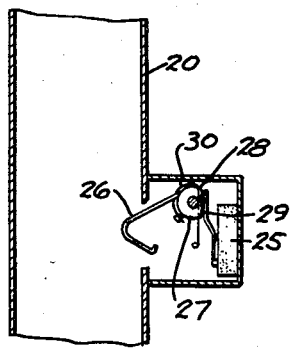
Fig. 6 is a diagrammatic view of an actuating switch for the circuit.

The circuit includes power lines 100, a power switch 101, and the four sub-circuits A, B, C and TM connected in parallel across the power lines. Circuit A is shunted around switch 101 by line 102 containing a switch 103. Actuating switches shown generally at 25 in Fig. 6 are represented at 25A, 25B and 25C in Fig. 5; the solenoids and limit switches shown generally at 64 and 65 in Fig. 3 are represented at 64A–C and 65A–C, respectively. The electrical apparatus may be mounted within transfer body 35 as indicated at 93.

It may be assumed initially that switches 101 and 103 are closed and no carriers are in inlets 20. Switches 25A, 25B and 25C are open and their respective circuits are de-energized. Normally closed switches 104, 105 and 106 establish a circuit energizing relay 107 which holds the contacts of master timer 108 closed. Relay 109 is energized, closing master control switches 110, 111 and 112 in circuits A, B and C, respectively. When a carrier enters an inlet 20, for example from conduit loop A, actuating switch 25A is closed, establishing a circuit through normally closed control switches 113, 114 and 115 to energize relay 116 and close switches 117 and 118. Relay 119 is thereby energized, closing switch 120 to establish a shunt around switches 110 and 117 and to energize solenoid 64A.

At the same time relay 119 opens switch 106 in circuit MT, de-energizing relay 107 and opening the contacts of master timer 108. Relay 109 is de-energized, opening master control switches 110, 111 and 112. Relay 119 and switch 120 hold the circuit through solenoid 64A which, through operating element 63, shifts valve 62 to the solid line position of Fig. 3, retracting a dispatcher 40 as described. Carrier 37 drops to shelf 36 opening switch 25A and de-energizing relay 116 to open switches 117 and 118. The circuit through solenoid 64A is held until the dispatcher closes limit switch 65A to energize relay 121 for actuating timer 122.

When timer 122 times out, its contacts open, de-energizing relay 119 and solenoid 64A, thereby advancing dispatcher 40 to dispatch carrier 37 into funnel 45. The dispatcher's forward motion opens switch 65A, de-energizing relay 121 to close the timer contacts 122. When relay 119 de-energizes, switch 106 closes, re-energizing relay 107 to actuate master timer 108. The master timer times out and its contacts close, energizing relay 109 to again close master control switches 110, 111 and 112. The cycle is repeated wherever a carrier enters an inlet 20 to close a switch 25, the operation of circuits B and C being the same as that described for circuit A.

Circuits B and C each contain relays, switches and a timer 123–129 and 130–136, respectively, which are the respective counterparts of switches, relays and timer 116–122 in circuit A. Corresponding relays 116, 123 and 130 each operates a control switch in the other two circuits: respectively, relay 116 operates switches 137 and 138 in circuits B and C; relay 123 operates 114 and 139 in A and C; and relay 130 operates 113 and 140 in A and B. Corresponding relays 141, 143 and 145 each operates a second control switch in one other circuit, i. e., switches 142, 144 and 115, respectively. Corresponding relays 116, 123 and 130 also operate switches 118, 125 and 132 in shunts around control switches 115, 142 and 144, respectively, and corresponding relays 119, 126 and 133 operate respectively switches 106, 105 and 104 in circuit MT.

If a carrier closes either or both of switches 25B and 25C while circuit A is energized, their respective circuits remain de-energized because control switches 137 and 142 in circuit B and 138 in circuit C are held open by energized relays 116 and 121 and cannot close until circuit A has been de-energized. While closing switch 25C actuates relay 145 to open control switch 115, relay 116 remains energized since it has previously closed switch 118 in the shunt around switch 115. Generally, any two of the circuits remain de-energized for so long as the third is energized.

When circuit A de-energizes, control switches 137 and 142 in circuit B and 138 in circuit C close. If actuating switch 25B is closed by a carrier, relay 123 is energized to close switch 124 and prepare circuit B for actuating its dispatcher when master control switch 111 is closed by the master timer. At the same time relay 123 opens control switch 114 in circuit A and energized relay 143 opens control switch 144 in circuit C. When master timer 108 times out, closing master switches 110, 111 and 112, circuit B is energized and relay 126, switches 124 and 127, limit switch 65B, relay 128 and timer 129 function in the sequence described for the corresponding parts of circuit A.

When circuit B is de-energized by timer 129, control switches 138 and 144 close and circuit C is prepared for actuating its dispatcher in the manner described for circuits A and B when master timer 108 closes master control switch 112. If switches 25A and 25B are closed when circuit C de-energizes, circuit A will be next prepared for energization by the closing of control switches 113 and 115 therein while circuit B is blocked by the opening of control switch 142 by energized relay 141. If switch 25A is open and 25B is closed when circuit C de-energizes, control switches 137 and 142 in circuit B will remain closed so that the closing of control switch 140 therein prepares circuit B for energization. Generally, the circuits actuate their respective dispatchers alternately or successively for so long as there are any carriers in inlets 20.

To stop the system, switches 101 and 103 are opened and if a circuit is energized, its carrier returns to forward position and comes to rest. To restart the system, switch 103 is first closed so that if switch 25A is closed, circuit A is prepared for energization and control switches 137, 142 and 138 in circuits B and C are opened. Switch 101 is then closed to energize relay 107 and actuate master timer 108. When the master timer times out, circuit A goes through its cycle and the system resumes operation. If switch 25A is open and 25B and 25C are closed when the system is started, circuits tend to establish for energizing both relay 123 and 130 simultaneously. In practice, the relays and switches differ mechanically to the extent that one of control switches 140 and 144 will open before the other, facilitating energization of its circuit while the other circuit is blocked. The system then resumes operation as described.

Transfer 11 is adapted for use with any number of conduit loops and can be used in complex systems having a number of interconnected sub-systems, each with a number of loops. To modify the transfer for use with various numbers of loops, it is necessary merely to change the number of inlets 20, dispatchers 40 and electrical operating circuits therefor. For each additional dispatcher, an operating circuit identical to those shown in A, B and C is added to the circuit of Fig. 5 and tied into the other circuits by the appropriate control switches. The timing cycles of the various timers may be regulated as desired according to operating conditions.

We claim:

1. In a pneumatic conveyor system, a plurality of conveyor tubes, a transfer device having inlet tubes into which said conveyor tubes connect, a common outlet tube, mechanical means in the transfer device operable to transfer carriers entering the same from said plurality of tubes into said common outlet tube, an electrical circuit associated with each inlet tube, an actuating switch in each inlet tube operable by a carrier therein to energize its circuit, a solenoid in each circuit operable when energized to cause actuation of the mechanical means to transfer a carrier from one inlet tube to the common outlet tube, a first relay coil in each circuit operable to open a first control switch in each of the other circuits so that when one circuit is energized the other circuits are opened, a second control switch in series with each first control switch, a second relay coil in each circuit operable responsively to the closing of its respective actuating switch to open a second control switch in another circuit, a shunt across said second control switch in each circuit, a switch in each shunt operable to close when its respective circuit is energized, whereby an energized circuit remains closed when said second control switch therein is opened, and another switch in each circuit operable to open its respective circuit after actuation of the mechanical means, whereby to de-energize said first relay therein for closing said first control switches and thereby prepare a circuit to be energized by its actuating switch.

2. The device defined in claim 1 wherein said switch in each shunt is closed by said first relay coil in its respective circuit.

3. The device defined in claim 1 wherein each circuit includes a switch operable upon movement of said mechanical means to energize another relay coil therein, said other relay coil being operative to open said other switch.

4. In a pneumatic conveyor system, a plurality of conveyor tubes, a transfer device having inlet tubes into which said conveyor tubes connect, a common outlet tube, mechanical means in the transfer device operable to transfer carriers entering the same from said plurality of tubes into said common outlet tube, an electrical circuit associated with each inlet tube, an actuating switch in each inlet tube operable by a carrier therein to energize its circuit, a solenoid in each circuit operable when energized to cause actuation of the mechanical means to transfer a carrier from one inlet tube to the common outlet tube, a first relay coil in each circuit operable to open a first control switch in each of the other circuits so that when one circuit is energized the other circuits are opened, a second control switch in series with each first control switch, a second relay coil in each circuit operable responsively to the closing of its respective actuating switch to open a second control switch in another circuit, a shunt across said second control switch in each circuit, a switch in each shunt operable to close when its respective circuit is energized, whereby an energized circuit remains closed when said second control switch therein is opened, and another switch in each circuit operable to open its respective circuit after actuation of the mechanical means, whereby to de-energize said first relay therein for closing said first control switches and thereby prepare another circuit to be energized by its actuating switch, an electrical timer connected to said circuits, a third relay coil for actuating said timer, a timer control switch for each of said circuits in series with said third relay, each timer control switch being operable by one of said first relay coils for energizing said third relay coil after said mechanical means has been actuated, a fourth relay coil energized by said timer when the latter completes a timing cycle, and a fourth control switch in each circuit operable to open said circuits when said fourth relay is de-energized, whereby to actuate said mechanical means at predetermined intervals.

5. In a pneumatic conveyor system, a plurality of conveyor tubes, a transfer device having inlet tubes into which said conveyor tubes connect, a common outlet tube, mechanical means in the transfer device operable to transfer carriers entering the same from said plurality of tubes into said common outlet tube, an electrical operating circuit associated with each inlet tube, a timer circuit connected to said operating circuits, an actuating switch in each inlet tube operable by a carrier therein to energize its respective operating circuit, a solenoid in each operating circuit operable when energized to cause actuation of said mechanical means, a first relay coil in each operating circuit operable when energized to open a first control switch in each other operating circuit so that when one operating circuit is energized the other operating circuits are opened, a second control switch in series with each first control switch, a second relay coil in each operating circuit operable responsively to the closing of its respective operating switch to open a second control switch in one other operating circuit, a shunt across said second control switch in each operating circuit, a switch in each shunt operable to close when its respective circuit is energized, whereby an energized circuit remains closed when said second control switch therein is opened, and another switch in each operating circuit operable to open its respective circuit after actuation of the mechanical means, whereby to de-energize said first relay therein for closing said first control switches in the other operating circuits and thereby prepare other operating circuits to be energized by said actuating switches, a timer in said timer circuit, switch means in said timer circuit operable by the de-energization of an operating circuit to actuate said timer, a master relay in said timing circuit operable to close a master switch in each operating circuit when said timer times out, whereby to actuate said mechanical means at predetermined time intervals.

6. The device defined in claim 5 wherein said timer circuit includes a control switch for each operating circuit in series with a timer relay coil, each operating circuit including a third relay coil operable when energized to open a control switch in said timer circuit and to close a shunt around the master control switch in its operating circuit, whereby to de-energize said timer relay coil and open the timer contacts while holding an operating circuit energized, the last said control switch being operable to close when its operative circuit is de-energized, whereby to actuate said timer.

7. In a pneumatic conveyor system, a plurality of tubes, a transfer device into which the tubes connect, a common outlet tube, said transfer device having a body, a plurality of movable members on said body, a shelf on said body aligned with the inlet ends of said tubes, means on said body forming a plurality of channels adjacent said shelf, said channels being decurrent into said common outlet tube, each movable member having one portion disposed over the inlet end of one of said tubes in one position of said member for receiving and supporting a carrier arriving at said transfer device, said portion being removed from said inlet in another position of said movable member so that a carrier may pass from a tube to said shelf, said movable member being operable to move a carrier on said shelf into one of said channels in returning to said one position, powered means for moving said member, and an electrical circuit associated with each inlet tube operative to actuate said powered means when a carrier is in the inlet tube, said electrical circuits being interconnected and including means actuating said powered means for moving the members at inlet tubes which contain carriers alternately and at predetermined intervals.

8. In a pneumatic conveyor system, a plurality of tubes, a transfer device into which the tubes connect, a common outlet tube, said transfer device having a body, a plurality of reciprocable members on said body, a shelf on said body aligned with the inlet ends of said tubes, means on said body forming a plurality of channels adjacent said shelf, said channels being decurrent into said common outlet tube, each reciprocable member having one portion disposed over the inlet end of one of said tubes in advanced position of said element for receiving and supporting a carrier arriving at said transfer device, said portion being removed from said inlet in retracted position of said movable member so that a carrier may pass from a tube to said shelf, said member having another portion operative to push a carrier on said shelf into one of said channels in moving from said retracted position, powered means for reciprocating said member, and an electrical circuit associated with each inlet tube operative to actuate said powered means when a carrier is in the inlet tube, said electrical circuits being interconnected and including means actuating said powered means for reciprocating the members at inlet tubes which contain carriers alternately and at predetermined intervals.

9. In a pneumatic conveyor system, a plurality of tubes, a transfer device into which the tubes connect, a common outlet tube, said transfer device having a body, a plurality of movable members on said body, a shelf on said body aligned with the inlet ends of said tubes, said shelf lying in the plane generally perpendicular to the axes of said tubes, means on said body forming a plurality of channels adjacent said shelf, said channels having their upstream ends adjacent said shelf and extending generally parallel to the axes of said tubes, said channels being decurrent into said common outlet tube, each movable member having one portion disposed over the inlet end of one of said tubes in one position of said member for receiving and supporting a carrier arriving at said transfer device, said portion being removed from said inlet in another position of said movable member so that a carrier may pass in an axial direction from a tube to said shelf, said movable member being operable to move a carrier on said shelf laterally into alignment with said upstream end of one of said channels in returning to said one position so that the carrier may pass into the channel, powered means for moving said member, and an electrical circuit associated with each inlet tube operative to actuate said powered means when a carrier is in the inlet tube, said electrical circuits being interconnected and including means actuating said powered means for moving the members at inlet tubes which contain carriers alternately and at predetermined intervals.

10. In a pneumatic conveyor system, a plurality of tubes, a transfer device into which the tubes connect, a common outlet tube, said transfer device having a body, a plurality of movable members on said body, a shelf on said body aligned with the inlet ends of said tubes, a funnel on said body having its upstream end adjacent said shelf, at least one flexible element depending into said funnel and forming therein a plurality of channels decurrent into said common outlet tube, each movable element having one portion disposed over the inlet end of one of said tubes in one position of said element for receiving and supporting a carrier arriving at said transfer device, said portion being removed from said inlet in another position of said movable member so that a carrier may pass from a tube to said shelf, said movable member being operable to move a carrier on said shelf into one of said channels in returning to said one position, powered means for moving said member, and an electrical circuit associated with each inlet tube operative to actuate said powered means when a carrier is in the inlet tube, said electrical circuits being interconnected and including means actuating said powered means for moving the members at inlet tubes which contain carriers alternately and at predetermined intervals.

11. The device defined in claim 10 characterized in that the downstream end of each flexible element is free.

12. In a pneumatic conveyor system, a plurality of tubes, a transfer device, said tubes connecting into the top of said transfer device, a common outlet tube at the bottom of said transfer device, said transfer device having a body, a plurality of reciprocable members on said body, a shelf on said body aligned with the inlet ends of said tubes and lying generally perpendicular to the axes thereof, a funnel having its large end adjacent said shelf, the lower end of said funnel connecting into said common outlet tube, at least one flexible element depending within said funnel to form therein a plurality of channels, said channels decurring into said common outlet tube, each element having free lower end, whereby to pass carriers in any of said channels, each reciprocal member having a top portion underlying the inlet of one of said tubes when in advanced position for receiving and supporting carriers arriving at said transfer device, said top portion being withdrawn from said inlet when said member is retracted so that a carrier may drop to said shelf, said movable member being operative in returning from said retracted position to push a carrier laterally off of said shelf so it may drop into one of said channels, powered means for reciprocating said members, and an electrical circuit associated with each inlet tube operative to actuate said powered means when a carrier is in the inlet tube, said electrical circuits being interconnected and including means actuating said powered means for moving the members at inlet tubes which contain carriers alternately and at predetermined intervals.

13. The device defined in claim 12 wherein said shelf has recessed means forming tracks for said reciprocable members.

14. A transfer device for use in a pneumatic conveyor system having a plurality of conveyor tubes for conveying carriers, said transfer device comprising, a body, a plurality of inlets on said body adapted to be connected to pneumatic conveyor tubes, receiving means on said body adapted and arranged to receive carriers from said inlets, discharge means on said body, independently movable means on said body for each inlet, each movable means being operable to dispatch carriers received from its respective inlet from said receiving means to said discharge means, said discharge means being operative to discharge carriers dispatched from said receiving means into a common conveyor tube, powered means operative to move said movable means, an electrical circuit associated with each inlet operative to actuate said powered means when a carrier is at said inlet, said electrical circuits being interconnected and being operable to actuate said powered means for moving said movable means at inlets which contain carriers alternately and at predetermined intervals.

15. A transfer device for use in a pneumatic conveyor system having a plurality of conveyor tubes for conveying carriers, said transfer device comprising, a body, a plurality of inlets on said body adapted to be connected to pneumatic conveyor tubes, receiving means on said body adapted and arranged to receive carriers from said inlets, said body having single outlet means, independently movable means on said body for each inlet, each movable means being operable to dispatch carriers received from its respective inlet from said receiving means to said outlet means, powered means operative to move said movable means, an electrical circuit associated with each inlet operative to actuate said powered means when a carrier is at said inlet, said electrical circuits being interconnected and being operable to actuate said powered means for moving said movable means at inlets which contain carriers alternately and at predetermined intervals.

16. A transfer device for use in a pneumatic conveyor system having a plurality of conveyor tubes for conveying carriers, said transfer device comprising, a body, a plurality of inlets on said body adapted to be connected to pneumatic conveyor tubes, receiving means on said body adapted and arranged to receive carriers from said inlets, said body having single outlet means, an independently reciprocable member at each inlet, each member having a forward position for closing its inlet and having a retracted position for passing a carrier from its inlet to said receiving means, each reciprocable member being operative upon moving to said forward position to move carriers received from its respective inlet from said receiving means to said outlet means, powered means operative to move said members, an electrical circuit associated with each inlet operative to actuate said powered means when a carrier is at said inlet, said electrical circuits being interconnected and being operable to actuate said powered means for moving the members at the inlets which contain carriers alternately and at predetermined intervals.

17. A transfer device for use in a pneumatic conveyor system having a plurality of conveyor tubes for conveying carriers, said transfer device comprising, a body, a plurality of inlets on said body adapted to be connected to pneumatic conveyor tubes, receiving means on said body adapted and arranged to receive carriers from said inlets, said body having single outlet means, an independently reciprocable member at each inlet, each member having a forward position for closing its inlet and having a retracted position for passing a carrier from its inlet to said receiving means, said parts being so constructed and arranged that a carrier moves in a generally straight path in passing from an inlet to said receiving means, said reciprocable members being arranged to move in paths generally normal to said paths of said carriers, each reciprocable member being operative upon moving to said forward position to move carriers received from its respective inlet from said receiving means to said outlet means, powered means operative to move said members, an electrical circuit associated with each inlet operative to actuate said powered means when a carrier is at said inlet, said electrical circuits being interconnected and being operable to actuate said powered means for moving the members at the inlets which contain carriers alternately and at predetermined intervals.

18. The device defined in claim 17 wherein said inlets are arranged generally rectilinearly and said reciprocable members are arranged to move in generally parallel paths substantially perpendicularly to the line of said inlets.

19. The device defined in claim 17 wherein said receiving means is disposed generally vertically beneath said inlets and said reciprocable members move in generally horizontal paths.

20. The device defined in claim 19 wherein said receiving means comprises a generally horizontal shelf having an edge adjacent said outlet means, said reciprocable means being movable toward and away from said edge of said shelf.

21. A transfer device for use in a pneumatic conveyor system having a plurality of conveyor tubes for conveying carriers, said transfer device comprising, a body, a plurality of inlets on said body adapted to be connected to pneumatic conveyor tubes, receiving means on said body adapted and arranged to receive carriers from said inlets, said body having single outlet means, said outlet means having funnel conformation with a larger end adjacent said receiving means and a smaller end adapted to be connected to a pneumatic conveyor tube, partition means in said outlet means, said partition means forming a plurality of channels in said outlet means, said channels being decurrent into said smaller end, said partitions being divertable to pass carriers from said larger end to said smaller end, independently movable means on said body for each inlet, each movable means being operable to dispatch carriers received from its respective inlet from said receiving means to said outlet means, powered means operative to move said movable means, an electrical circuit associated with each inlet operative to actuate said powered means when a carrier is at said inlet, said electrical circuits being interconnected and being operable to actuate said powered means for moving said movable means at inlets which contain carriers alternately and at predetermined intervals.

22. The device defined in claim 21 wherein the ends of said partitions adjacent said smaller end of said outlet means are free to facilitate diverting the partitions.

23. The device defined in claim 22 wherein said partitions are formed of a generally form retaining but flexible material such as leather.

24. A transfer device for use in a pneumatic conveyor system having a plurality of conveyor tubes for conveying carriers, said transfer device comprising, a body, a plurality of inlets on said body adapted to be connected to pneumatic conveyor tubes, mechanical means on said body operable to transfer carriers at said inlets to a common conveyor tube, an electrical circuit for each inlet, said circuits being interconnected, electric motor means in each circuit, said motor means being operably connected to said mechanical means, actuating means in each circuit, said actuating means being operable by carriers at said inlets to energize said circuits for operating said motor means, first control means in each circuit operative when its circuit is energized to open each other circuit and prevent energization thereof by said actuating means, second control means in each circuit operable by the actuating means in that circuit to open another circuit, holding means in each circuit operative when its circuit is energized to hold the same in energized condition when said second control means in another circuit operates relatively to the energized circuit, means in each circuit operable to deenergize its circuit responsively to operation of said motor means relatively to that circuit, whereby to inactivate said first control means for that circuit and condition another circuit for energization by the actuating means in the latter circuit, and timer means operable responsively to operation of said motor means for one circuit to close, after a predetermined time interval, another circuit previously conditioned for energization by its actuating means, whereby to transfer carriers from the inlets containing carriers alternately and at predetermined intervals.

25. A transfer device for use in a pneumatic conveyor system having a plurality of conveyor tubes for conveying carriers, said transfer device comprising, a body, a plurality of inlets on said body adapted to be connected to pneumatic conveyor tubes, mechanical means on said body operable to transfer carriers at said inlets to a common conveyor tube, an electrical circuit for each inlet, said circuits being interconnected, electric motor means in each circuit, said motor means being operably connected to said mechanical means, actuating means in each circuit, said actuating means being operable by carrier at said inlets to energize said circuits for operating said motor means, first control means in each circuit operative when its circuit is energized to open each other circuit and prevent energization thereof by said actuating means, second control means in each circuit operable by the actuating means in that circuit to open another circuit, holding means in each circuit operative when its circuit is energized to hold the same in energized condition when said second control means in another circuit operates relatively to the energized circuit, means in each circuit operable to deenergize its circuit responsively to operation of said motor means relatively to that circuit, whereby to inactivate said first control means for that circuit and condition another circuit for energization by the actuating means in the latter circuit, timer means operably connected to said circuits, said timer means being operative responsively to energization of a circuit to open said circuits to prevent energization thereof, each circuit having second holding means operative when its circuit is energized to hold the same in energized condition when said timer means operates, said timer means being operable responsively to operation of said motor means for one circuit to close, after a predetermined time interval, another circuit previously conditioned for energization by its actuating means, whereby to transfer carriers from the inlets containing carriers alternatively and at predetermined intervals.

26. A transfer device for use in a pneumatic conveyor system having a plurality of conveyor tubes for conveying carriers, said transfer device comprising, a body, a plurality of inlets on said body adapted to be connected to pneumatic conveyor tubes, mechanical means on said body operable to transfer carriers at said inlets to a common conveyor tube, said mechanical means including a movable dispatcher at each inlet operative to admit a carrier from an inlet upon moving in one direction and to dispatch a carrier so admitted on moving in another direction, an electrical circuit for each inlet, said circuits being interconnected, electric motor means in each circuit, said motor means being operably connected to said dispatches, actuating means in each circuit, said actuating means being operable by carriers at said inlets to energize said circuits for operating said motor means to move said dispatches in said one direction, first control means in each circuit operative when its circuit is energized to open each other circuit and prevent energization thereof by said actuating means, second control means in each circuit operable by the actuating means in that circuit to open another circuit, holding means in each circuit operative when its circuit is energized to hold the same in energized condition when said second control means in another circuit operates relatively to the energized circuit, first timer means in each circuit operable responsively to movement of the dispatcher at its inlet in said one direction to deenergize its circuit after a time interval adequate for admitting a carrier from its inlet, whereby also to inactivate said first control means for that circuit and condition another circuit for energization by the actuating means in the latter circuit, said motor means being operative responsively to deenergization of a circuit to move the dispatcher corresponding to that circuit in said other direction, and second timer means operable responsively to deenergization of a circuit, to close, after a predetermined time interval, another circuit previously conditioned for energization by its actuating means, whereby to transfer carriers from the inlets containing carriers alternatively and at predetermined intervals.

27. In a pneumatic conveyor system, a plurality of conveyor tubes, a transfer device to which said tubes connect, said transfer device having receiving means adapted and arranged to receive carriers from said conveyor tubes, said transfer device having discharge means, independently movable means on said transfer device for each conveyor tube, each movable means being operable to dispatch carriers received from its respective tube from said receiving means to said discharge means, said discharge means being operative to discharge carriers dispatched from said receiving means into a common conveyor tube, powered means operative to move said movable means, and an electrical circuit associated with each tube and operative to actuate said powered means when a carrier is in the associated tube in a position adjacent said receiving means, said electrical circuits being interconnected and being operable to actuate said powered means for moving the movable means associated with the tubes containing carriers in said position adjacent said receiving means alternately and at predetermined intervals.

References Cited in the file of this patent

UNITED STATES PATENTS

| | | |
|---|---|---|
| 1,733,026 | McGuinness et al. | Oct. 22, 1929 |
| 1,776,697 | McGuinness et al. | Sept. 23, 1930 |
| 1,814,947 | McGuinness et al. | July 14, 1931 |
| 2,052,597 | Beckmann | Sept. 1, 1936 |
| 2,281,466 | Terry | Apr. 28, 1942 |

FOREIGN PATENTS

| | | |
|---|---|---|
| 665,674 | Germany | Sept. 30, 1938 |
| 499,297 | Great Britain | Jan. 20, 1939 |
| 115,320 | Australia | June 25, 1942 |